United States Patent
Fujimoto et al.

(10) Patent No.: US 9,564,850 B2
(45) Date of Patent: Feb. 7, 2017

(54) DOOR OPENING/CLOSING CONTROL DEVICE

(71) Applicants: Keigo Fujimoto, Aichi (JP); Yoshiki Yamagishi, Aichi (JP); Yasutaka Shirota, Columbus, OH (US)

(72) Inventors: Keigo Fujimoto, Aichi (JP); Yoshiki Yamagishi, Aichi (JP); Yasutaka Shirota, Columbus, OH (US)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/671,324

(22) Filed: Mar. 27, 2015

(65) Prior Publication Data
US 2015/0280635 A1    Oct. 1, 2015

(30) Foreign Application Priority Data

Mar. 28, 2014   (JP) .................................. 2014-068068

(51) Int. Cl.
*H02P 31/00*   (2006.01)
*H02P 3/00*   (2006.01)
(Continued)

(52) U.S. Cl.
CPC ............... *H02P 31/00* (2013.01); *E05F 15/70* (2015.01); *E05Y 2400/85* (2013.01);
(Continued)

(58) Field of Classification Search
CPC ....................................................... H02P 31/00
(Continued)

(56) References Cited

U.S. PATENT DOCUMENTS 5,982,126 A * 11/1999 Hellinga ................... B60J 5/06
318/286
2007/0132273 A1* 6/2007 Suzuki ................... E05B 81/20
296/155

(Continued)

FOREIGN PATENT DOCUMENTS

JP    2001-193353 A   7/2001
JP    2008-095407 A   4/2008
(Continued)

*Primary Examiner* — Erick Glass
(74) *Attorney, Agent, or Firm* — Osha Liang LLP

(57) ABSTRACT

A door opening/closing control device includes: a controller controlling driving of an actuator opening or closing a door; a position detector detecting an opening/closing position of the door; a speed calculator calculating an opening/closing speed of the door based on a temporal change in the opening/closing position detected by the position detector; and a target assisting force calculator calculating target assisting force based on the opening/closing position and the opening/closing speed of the door. The controller controls the driving of the actuator to assist an operation of opening or closing the door based on the target assisting force calculated by the target assisting force calculator. Further, the controller controls the driving of the actuator such that the door is fully closed upon judgment that the opening/closing position of the door is in the vicinity of the fully closed position based on the opening/closing position detected by the position detector.

2 Claims, 13 Drawing Sheets

(51) Int. Cl.
*H02P 7/06* (2006.01)
*H02P 7/14* (2006.01)
*E05F 15/70* (2015.01)

(52) U.S. Cl.
CPC ...... *E05Y 2800/11* (2013.01); *E05Y 2800/113* (2013.01); *E05Y 2900/50* (2013.01)

(58) Field of Classification Search
USPC ........................................................ 318/504
See application file for complete search history.

(56) References Cited

U.S. PATENT DOCUMENTS

| | | | | |
|---|---|---|---|---|
| 2009/0107050 A1* | 4/2009 | Suzuki | .................... | E05F 15/70 49/360 |
| 2009/0115366 A1* | 5/2009 | Mullet | .................. | E05F 15/668 318/466 |
| 2010/0050526 A1* | 3/2010 | Ozaki | ................. | E05F 15/0013 49/28 |
| 2010/0168920 A1* | 7/2010 | Hooker | ................. | F25D 25/025 700/275 |

FOREIGN PATENT DOCUMENTS

| | | |
|---|---|---|
| JP | 2011-026940 A | 2/2011 |
| JP | 2011-236697 A | 11/2011 |

\* cited by examiner

<Auto-closing process>

<Auto-opening process, Auto-closing process>

<Power assisting process>

<Fully closed position vicinity process>

<Fully closed position vicinity process>

<Fully opened position vicinity process>

<Fully opened position vicinity process>

DOOR OPENING/CLOSING CONTROL DEVICE

CROSS-REFERENCE TO RELATED APPLICATION

This application is based on Japanese Patent Application No. 2014-068068 filed with the Japan Patent Office on Mar. 28, 2014, the entire contents of which are incorporated herein by reference.

FIELD

The disclosure relates to a door opening/closing control device that applies operation assisting force when an operation of opening or closing a door, such as a back door or a slide door of a vehicle, is manually performed.

BACKGROUND

As a door opening/closing control device that is mounted in a vehicle, for example, there are a power back door (also referred to as "power tail gate") control device, and a power slide door control device. These door opening/closing control devices each uses a motor as an actuator, rotates the motor and activates a door opening/closing mechanism, to open or close the back door or the slide door. Further, there is also a door opening/closing control device provided with a power assisting function, which applies operation assisting force by the actuator so as to allow an operator to perform an operation of opening or closing the door by small force when the operation of opening or closing the door is manually performed (e.g., Unexamined Japanese Patent Publication No. 2008-95407, Unexamined Japanese Patent Publication No. 2011-236697, Unexamined Japanese Patent Publication No. 2001-193353 and Unexamined Japanese Patent Publication No. 2011-26940).

In a door opening/closing control device of Unexamined Japanese Patent Publication No. 2008-95407, in order to reduce impact at a sudden stop of a slide door at a fully closed or a fully opened position, a target door speed is switched to a smaller value in the case of a door speed being larger than a predetermined value when the slide door reaches the vicinity of the fully closed position or the fully opened position. Then, driving of a motor is controlled such that an actual door speed gets close to the target door speed.

In a door opening/closing control device of Unexamined Japanese Patent Publication No. 2011-236697, in order to realize comfortable operation feeling, an amount of power supply to a motor is regulated based on an electric current flowing in the motor and a change in a moving speed of the slide door, thereby to control an opening/closing speed of the slide door.

In a door opening/closing control device of Unexamined Japanese Patent Publication No. 2001-193353, in order to transfer opening/closing of a slide door from a manual to an automatic at whichever position the slide door is, an operating direction (opening/closing direction) of the slide door is judged based on two pulses with shifted phases which are generated from a pulse generating unit in accordance with opening/closing of the sliding door. The motor is then driven in the opening direction or the closing direction in association with that operating direction.

In a door opening/closing control device of Unexamined Japanese Patent Publication No. 2011-26940, an operation amount of a handle for opening/closing a back door is detected and driving of a motor is controlled in accordance with the operation amount, to assist part of operation force required for an operation of opening or closing the back door. Further, in order to reduce the size of the device by use of a low-power motor, the opening/closing operation is assisted by a motor in a range up to a half-opened state of the back door.

For example, when the driving of the actuator is stopped in the case of the operator stopping the manual operation of closing the door in the vicinity of the fully closed position in a power assisting state, the door is left in a slightly opened state. Further, for example, when the actuator is automatically kept driving in the case of the operator stopping the manual operation of closing the door so as to allow the door to stand still at an intermediate position being between the fully closed position and the fully opened position, the door does not stand still at the desired intermediate position. This is inconvenient.

SUMMARY

One or more embodiments of the disclosure provide a door opening/closing control device capable of improving the usability of a door in a power assisting state.

A door opening/closing control device according to one or more embodiments of the disclosure includes: a controller configured to control driving of an actuator that opens or closes a door; a position detector configured to detect an opening/closing position of the door; a speed calculator configured to calculate an opening/closing speed of the door based on a temporal change in the opening/closing position detected by the position detector; and a target assisting force calculator configured to calculate target assisting force based on the opening/closing position detected by the position detector and the opening/closing speed calculated by the speed calculator. The controller controls the driving of the actuator so as to assist an operation of opening or closing the door based on the target assisting force calculated by the target assisting force calculator. Further, the controller controls the driving of the actuator such that the door is fully closed upon judgment that the opening/closing position of the door is in the vicinity of the fully closed position based on the opening/closing position detected by the position detector.

According to the above, for example, no matter whether or not the operator stops the manual operation of closing the door in the vicinity of the fully closed position in the power assisting state, the driving of the actuator is controlled such that the door is fully closed. For this reason, the door is not left in a slightly opened state. Further, for example, even when the operator stops the manual operation of closing the door halfway so as to allow the door to stand still at an intermediate position being between the fully closed position and the fully opened position, the door is not fully closed by the driving of the actuator unless the position of the door is in the vicinity of the fully closed position. Hence it is possible to allow the door to stand still at the desired intermediate position. From the above, it is possible to improve the usability of the door in the power assisting state.

Further, in one or more embodiments of the disclosure, in the above door opening/closing control device, the controller may control the driving of the actuator such that the door is fully closed upon judgment that the opening/closing position of the door is in the vicinity of the fully closed position in the case of controlling the driving of the actuator so as to assist the operation of closing the door.

Further, in one or more embodiments of the disclosure, in the above door opening/closing control device, the controller may control the driving of the actuator such that the door is fully opened upon judgment that the opening/closing position of the door is in the vicinity of the fully opened position based on the opening/closing position detected by the position detector.

Further, in one or more embodiments of the disclosure, in the above door opening/closing control device, the controller may control the driving of the actuator such that the door is fully opened upon judgment that the opening/closing position of the door is in the vicinity of the fully opened position in the case of controlling the driving of the actuator so as to assist the operation of opening the door.

According to one or more embodiments of the disclosure, it is possible to provide a door opening/closing control device capable of improving the usability of a door in a power assisting state.

DETAILED DESCRIPTION

Hereinafter, embodiments of the disclosure will be described with reference to the drawings. In the respective drawings, the same portions or the corresponding portions are provided with the same numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

First, a configuration of one or more embodiments of the disclosure will be described with reference to FIGS. 1 and 2.

Figure 1:
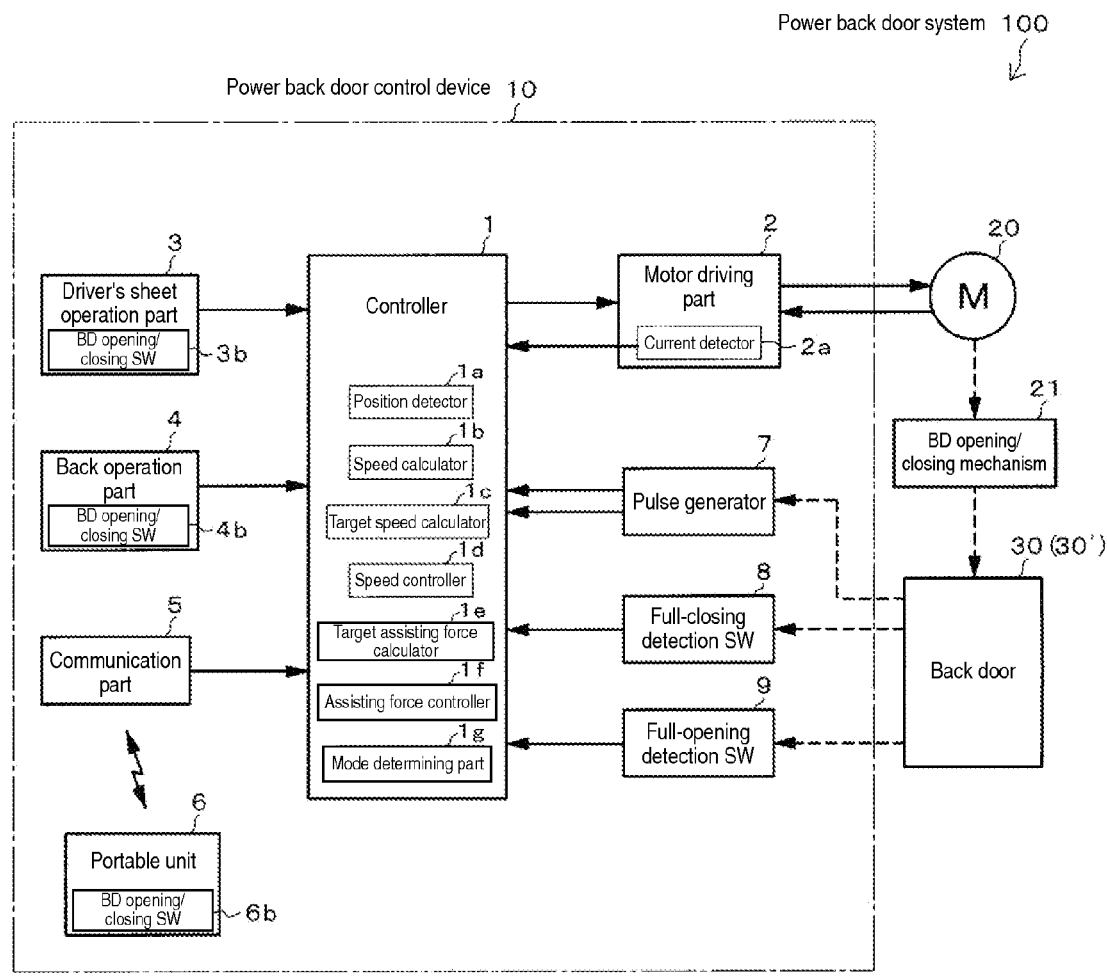
FIG. 1 is a diagram showing a configuration of a power back door control device according to one or more embodiments of the disclosure.

FIG. 1 is a diagram showing a configuration of a power back door control device 10. FIG. 2 is a view showing one example of a back door 30.

In FIG. 1, the power back door control device 10 is incorporated into a power back door system 100 along with a motor 20, a BD (back door) opening/closing mechanism 21 and the back door 30. This power back door system 100 is mounted in an automatic four-wheel car.

Figure 2:
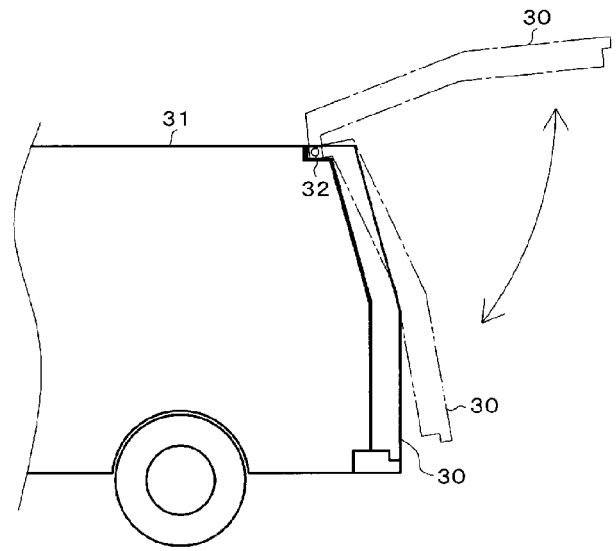
FIG. 2 is a view showing one example of a back door.

The power back door control device 10 is provided in a car body 31 of FIG. 2. The BD opening/closing function 21 for opening/closing the back door 30 is provided in the car body 31 and the back door 30. The motor 20 is a power source of the BD opening/closing function 21, and provided in the car body 31.

As shown in FIG. 2, the back door 30 is made up of a flip-up door provided on the back surface of the car body 31 of the automatic four-wheel car. The back door 30 is getting open by its lower end swinging upward around a rotation axis 32 located at its upper end, and is conversely getting closed by its lower end swinging downward. The power back door control device 10 activates the BD opening/closing function 21 by driving the motor 20 by normal rotation or reverse rotation, to automatically open or close the back door 30.

Further, it is possible to manually perform the operation of opening or closing of the back door 30 by holding its lower end or gripper (not shown). When the operation of opening or closing the back door 30 is manually performed, the power back door control device 10 applies operation assisting force by the motor 20, to allow the operator to perform the operation of opening or closing the back door 30 by small force (power assisting function).

The power back door control device 10 is one example of the "door opening/closing control device" of the disclosure. The back door 30 is one example of the "door" of the disclosure. The motor 20 is one example of the "actuator" of the disclosure.

The power back door control device 10 is provided with a controller 1, a motor driving part 2, a driver's seat operation part 3, a back operation part 4, a communication part 5, a portable unit 6, a pulse generator 7, a full-closing detection SW (switch) 8, and a full-opening detection SW (switch) 9.

The controller 1 is made up of a microcomputer. The controller 1 is provided with a position detector 1a, a speed calculator 1b, a target speed calculator 1c, a speed controller 1d, a target assisting force calculator 1e, an assisting force controller 1f, and a mode determining part 1g.

The motor driving part 2 is made up of a drive circuit for driving the motor 20 by a PWM (Pulse Width Modulation) signal. The controller 1 controls driving of the motor 20 by the motor driving part 2. The motor driving part 2 is provided with a current detector 2a for detecting an electric current flowing in the motor 20 (hereinafter referred to as "motor current"). The detection of the motor current by the current detector 2a is performed suitably or in a predetermined period.

The driver's seat operation part 3 is made up of an operation switch and the like provided at the driver's seat of the automatic four-wheel car. The back operation part 4 is made up of an operation switch and the like provided at the back of the car body 31 (outside the car). The drivers seat operation part 3 and the back operation part 4 are respectively provided with BD opening/closing SWs (switches) 3b, 4b that are operated for an automatic operation of opening or closing the back door 30.

The communication part 5 is provided with an antenna and a circuit for performing wireless communications (communications by a LF (Low Frequency) signal, a UHF (Ultra High Frequency), etc.) with the portable unit 6. The portable unit 6 is made up of an FOB key in a passive entry system, and carried by a user. The portable unit 6 is also provided with a BD opening/closing SW (switch) 6b that is operated for automatic operation of opening or closing the back door 30.

The pulse generator 7 is, for example, made up of a two-phase rotary encoder, and is provided in the motor 20 or the BD opening/closing function 21. The pulse generator 7 outputs two pulse signals with shifted phases to the controller 1 in accordance with a rotating state of the motor 20 or an operating state of the BD opening/closing function 21.

The rotating state of the motor 20, the operating state of the BD opening/closing function 21 and the opening/closing state of the back door 30 are interlocked. For this reason, the position detector 1a of the controller 1 detects two pulse signals outputted from the pulse generator 7, and detects an opening/closing position of the back door 30 (hereinafter referred to as "door position") based on the pulse signals. The speed calculator 1b calculates an opening/closing speed of the back door 30 (hereinafter referred to as "door speed") based on a temporal change in the door position detected by the position detector 1a. The detection of the door position by the position detector 1a and the calculation of the door speed by the speed calculator 1b are performed suitably or in a predetermined cycle as needed.

The full-closing detection SW (switch) 8 and the full-opening detection SW (switch) 9 are provided at the back of the car body 31. The full-closing detection SW 8 detects that the back door 30 is fully closed and outputs a detection signal to the controller 1. The full-opening detection SW 9 detects that the back door 30 is fully opened and outputs a detection signal to the controller 1. The position detector 1a detects that the back door 30 is at a fully closed position or a fully opened position based on the output signal from the full-closing detection SW 8 or the full-opening detection SW 9.

The target speed calculator 1c of the controller 1 calculates a target speed at the time of opening/closing the back door 30 based on the door position detected by the position detector 1a. The speed controller 1d controls a speed of the motor 20 based on the target speed calculated by the target speed calculator 1c and the door speed calculated by the speed calculator 1b.

At the time of power assisting control, the target assisting force calculator 1e calculates target assisting force based on the door position detected by the position detector 1a and the door speed calculated by the speed calculator 1b. The assisting force controller 1f controls the driving of the motor 20 based on the target assisting force calculated by the target assisting force calculator 1e and the motor current detected by the current detector 2a. The mode determining part 1g determines a mode for controlling the motor 20 based on the door position calculated by the position detector 1a, the door speed calculated by the speed calculator 1b and operating states of the BD opening/closing SWs 3b, 4b, 6b.

Next, an operation of the power back door control device 10 of the first embodiment will be described with reference to FIGS. 3 to 12.

Figure 3:
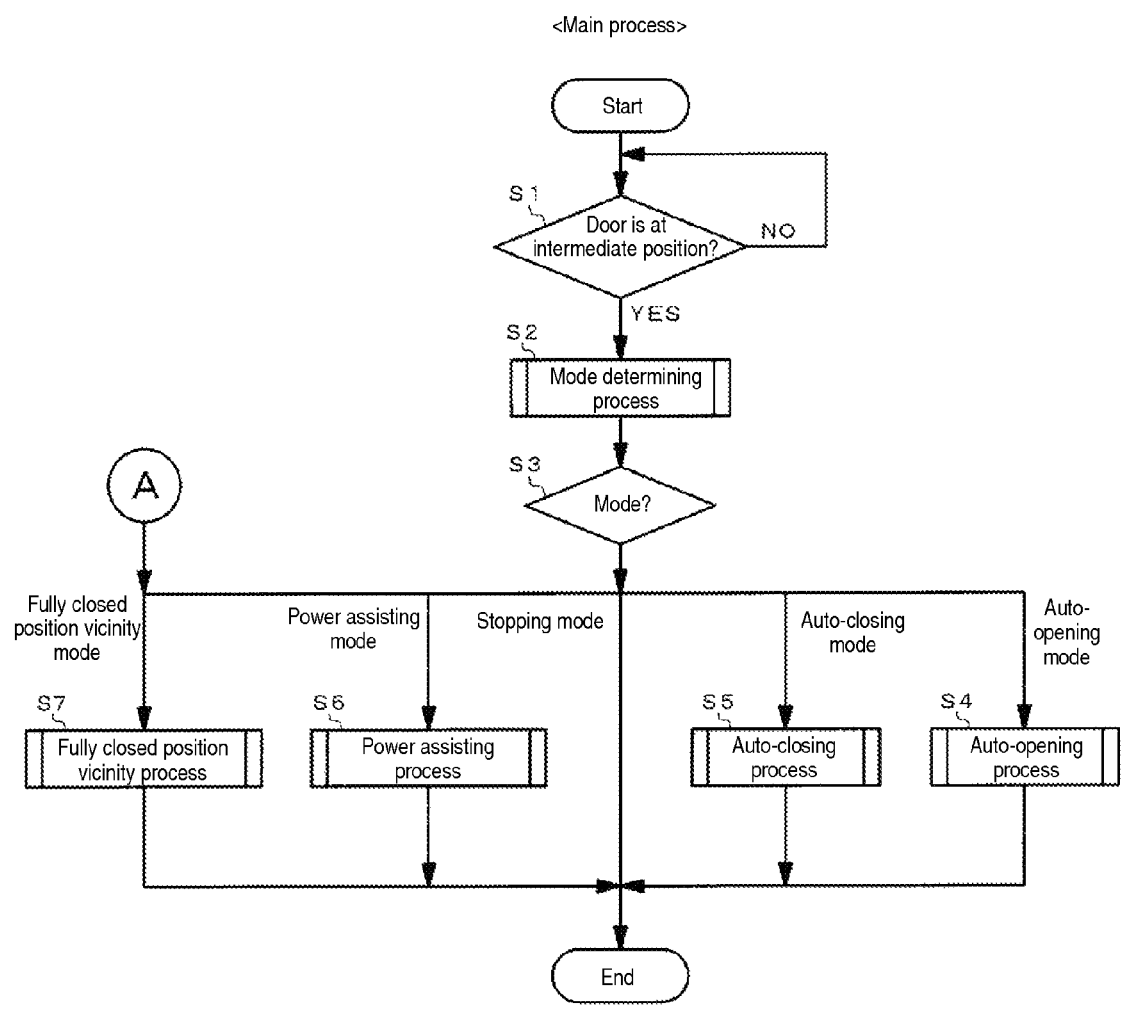
FIG. 3 is a flowchart showing a main process of the power back door control device according to a first embodiment.

FIG. 3 is a flowchart showing a main process of the power back door control device 10 of the first embodiment. When the controller 1 judges that the back door 30 is at the intermediate position being between the fully closed position and the fully opened position from the door position detected in the position detector 1a (Step S1 of FIG. 3: YES), the controller 1 performs a mode determining process by the mode determining part 1g (Step S2 of FIG. 3).

Figure 4:
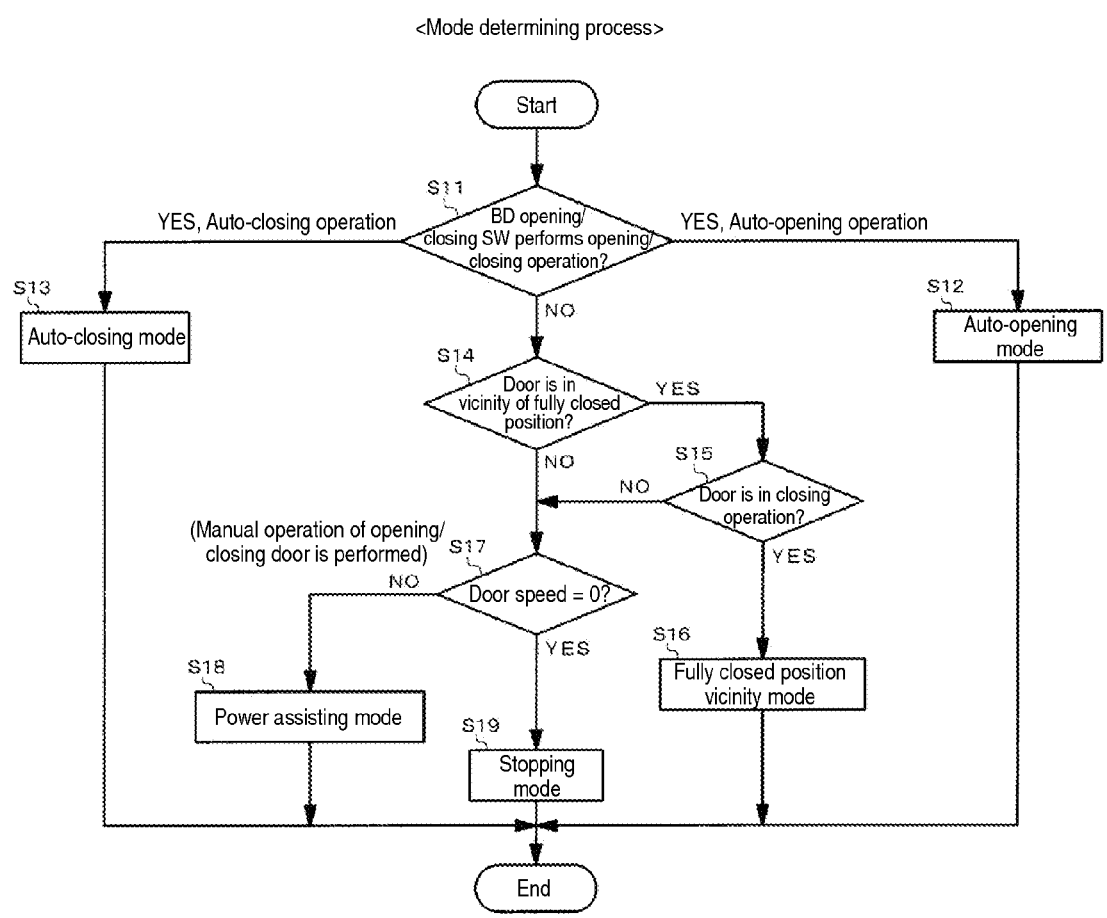
FIG. 4 is a flowchart showing a detail of a mode determining process of FIG. 3.

FIG. 4 is a flowchart showing a detail of that mode determining process. When the auto-opening operation is performed in any of the BD opening/closing SWs 3b, 4b, 6b (Step S11 of FIG. 4: YES, auto-opening operation), the mode determining part 1g determines that a switching destination is an auto-opening mode (Step S12 of FIG. 4). Further, when the auto-closing operation is performed in any of the BD opening/closing SWs 3b, 4b, 6b (Step S11 of FIG. 4: YES, auto-closing operation), the mode determining part 1g determines that the switching destination is an auto-closing mode (Step S13 of FIG. 4).

Further, when the back door 30 is in the vicinity of the fully closed position in a state where the auto-opening/closing operation is not performed in the BD opening/closing SWs 3b, 4b, 6b (Step S11 of FIG. 4: NO), the controller 1 judges that the back door 30 is in the vicinity of the fully closed position based on the door position detected in the position detector 1a (Step S14 of FIG. 4: YES). Moreover, when the operation of closing the back door 30 is being manually performed, the controller 1 judges that the back door 30 is in the closing operation based on a temporal change in the door position (Step S15 of FIG. 4: YES). The mode determining part 1g then determines that the switching destination is a fully closed position vicinity mode (Step S16 of FIG. 4).

It is to be noted that the vicinity of the fully closed position indicates a predetermined opening/closing range of the back door 30 so close to the fully closed position that a person or an object cannot get in or out. In the present example, in a case where an opening angle of the back door 30 when it is at the fully closed position is taken as 0°, a range with the opening angle of the back door 30 being from 10° to 20° (inclusive) is set as the vicinity of the fully closed position. In FIG. 2, the back door 30 being at the fully closed position is indicated by a solid line. The back door 30 being at the fully opened position is indicated by a dashed line. The back door 30 being in the vicinity of the fully closed position is indicated by a chain double-dashed line.

Even when the back door 30 is in the vicinity of the fully closed position (Step S14 of FIG. 4: YES), unless the back door 30 is in the closing operation (Step S15 of FIG. 4: NO), the controller 1 confirms the door speed calculated in the speed calculator 1b. Further, also when the auto-opening/closing operation is not performed in the BD opening/closing SWs 3b, 4b, 6b (Step S11 of FIG. 4: NO) and the back door 30 is not in the vicinity of the fully closed position (Step S14 of FIG. 4: NO), the controller 1 confirms the door speed calculated in the speed calculator 1b. Here, when the operation of opening or closing the back door 30 is being manually performed, the door speed calculated in the speed calculator 1b becomes a value other than 0 (Step S17 of FIG. 4: NO). In this case, the mode determining part 1g determines that the switching destination is a power assisting mode (Step S18 of FIG. 4).

Further, when the operation of opening or closing the back door 30 is not manually performed and the back door 30 stands still, the door speed calculated in the speed calculator 1b becomes 0 (Step S17 of FIG. 4: YES), and hence the mode determining part 1g determines that the switching destination is a stopping mode (Step S19 of FIG. 4).

When the mode is switched from Step S3 of FIG. 3 to the stopping mode in accordance with a result of the judgment in the mode determining process of FIG. 4, the controller 1 completes the main process without driving the motor 20. Accordingly, the back door 30 remains standing still at the intermediate position off the vicinity of the fully closed position.

Further, when the mode is switched from Step S3 of FIG. 3 to the auto-opening mode in accordance with a result of the judgment in the mode determining process of FIG. 4, the controller 1 executes an auto-opening process (Step S4 of FIG. 3).

Figure 5:
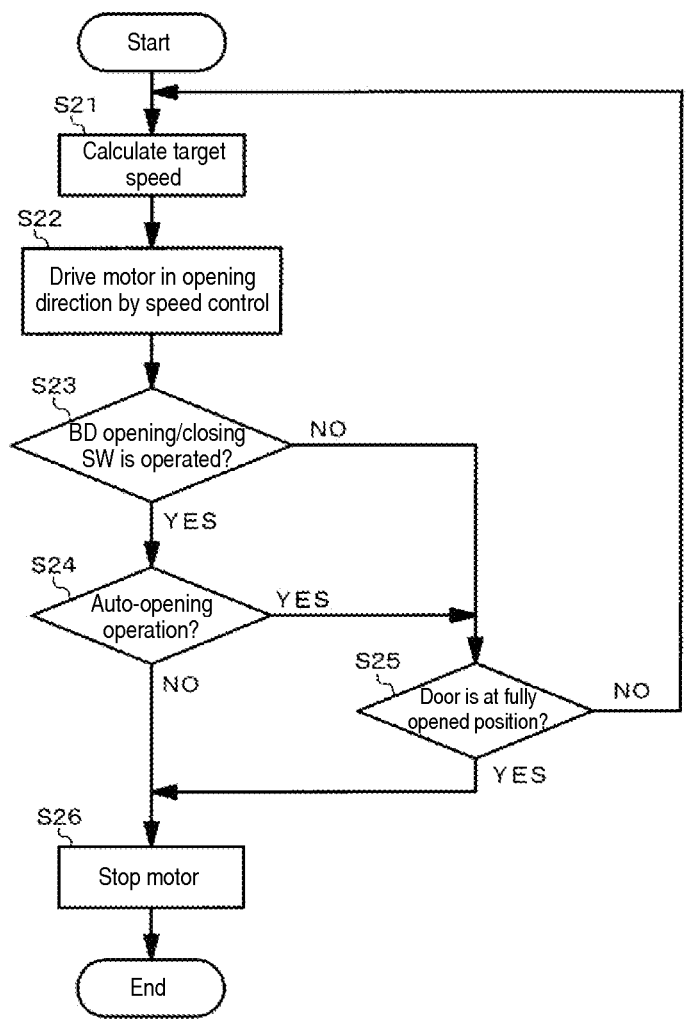
FIG. 5 is a flowchart showing a detail of an auto-opening process of FIG. 3.
Figure 7:
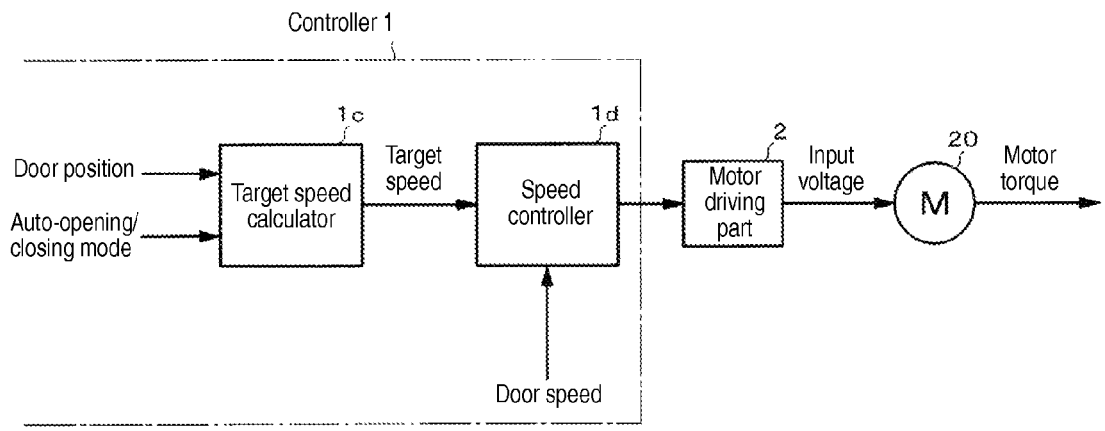
FIG. 7 is a block diagram showing a detail of the auto-opening process and the auto-closing process of FIG. 3.

FIG. 5 is a flowchart showing a detail of that auto-opening process. FIG. 7 is a block diagram showing a detail of the auto-opening process and an auto-closing process. When the auto-opening process is started, as shown in FIG. 7, the target speed calculator 1c calculates a target speed based on the door position detected in the position detector 1a (Step S21 of FIG. 5). Next, the speed controller 1d drives the motor 20 in an opening direction (e.g., normal rotation) while performing speed control (Step S22 of FIG. 5).

Specifically, the speed controller 1d controls an input voltage into the motor 20 by the motor driving part 2 such that the target speed calculated in the target speed calculator 1c agrees with the door speed calculated in the speed calculator 1b, to drive the motor 20 in the opening direction. This activates the BD opening/closing function 21, and the back door 30 is automatically getting open.

Thereafter, when the BD opening/closing SWs 3b, 4b, 6b are not operated (Step S23 of FIG. 5: NO), the processes of Steps S21 to S25 are repeated until the back door 30 reaches the fully opened position (Step S25 of FIG. 5: NO).

Further, even when any of the BD opening/closing SWs 3b, 4b, 6b is operated (Step S23 of FIG. 5: YES), if that is the auto-opening operation (Step S24 of FIG. 5: YES), the processes of Steps S21 to S25 are repeated until the back door 30 reaches the fully opened position (Step S25 of FIG. 5: NO).

Moreover, when any of the BD opening/closing SWs 3b, 4b, 6b is operated (Step S23 of FIG. 5: YES) and it is an operation (stopping operation or auto-closing operation) other than the auto-opening operation (Step S24 of FIG. 5: NO), the previously accepted auto-opening operation becomes invalid. Accordingly, the controller 1 stops the driving of the motor 20 (Step S26 of FIG. 5), to complete the auto-opening process. Subsequently, the main process of FIG. 3 is executed again, and the mode is switched to a mode (stopping mode or auto-closing mode) in accordance with the operation of the BD opening/closing SW 3b, 4b, 6b.

Further, it is assumed that an operation other than the auto-opening operation is not performed in the BD opening/closing SWs 3b, 4b, 6b (Step S23 of FIG. 5: NO or Step S24: YES) and the back door 30 reaches the fully opened position. Then, the controller 1 judges that the back door 30 is at the fully opened position based on the door position detected in the position detector 1a (Step S25 of FIG. 5: YES). The controller 1 then stops the driving of the motor 20 (Step S26 of FIG. 5), to complete the auto-opening process.

In contrast, when the mode is switched from Step S3 of FIG. 3 to the auto-closing mode in accordance with a result of the judgment in the mode determining process of FIG. 4, the controller 1 executes an auto-closing process (Step S5 of FIG. 3).

Figure 6:
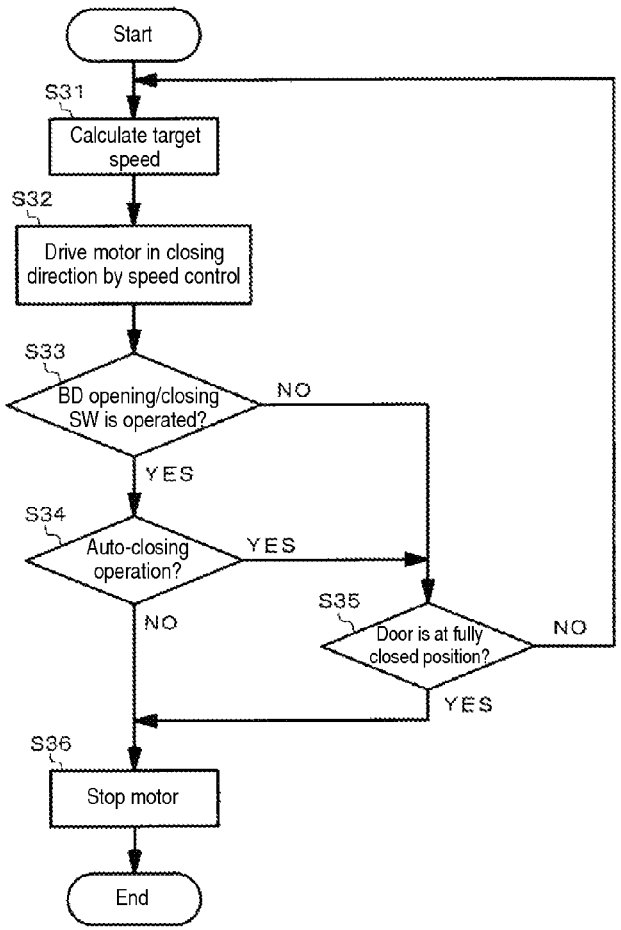
FIG. 6 is a flowchart showing a detail of an auto-closing process of FIG. 3.

FIG. 6 is a flowchart showing a detail of that auto-closing process. When the auto-closing process is started, as shown in FIG. 7, the target speed calculator 1c calculates a target speed based on the door position detected in the position detector 1a (Step S31 of FIG. 6). Next, the speed controller 1d drives the motor 20 in a closing direction (e.g., reverse rotation) while performing speed control (Step S32 of FIG. 6).

Specifically, the speed controller 1d controls an input voltage into the motor 20 by the motor driving part 2 such that the target speed calculated in the target speed calculator 1c agrees with the door speed calculated in the speed calculator 1b, to drive the motor 20 in the closing direction. This activates the BD opening/closing function 21, and the back door 30 is automatically getting closed.

Thereafter, when the BD opening/closing SWs 3b, 4b, 6b are not operated (Step S33 of FIG. 6: NO), the processes of Steps S31 to S35 are repeated until the back door 30 reaches the fully closed position (Step S35 of FIG. 6: NO).

Further, even when any of the BD opening/closing SWs 3b, 4b, 6b is operated (Step S33 of FIG. 6: YES), if that is the auto-closing operation (Step S34 of FIG. 6: YES), the processes of Steps S31 to S35 are repeated until the back door 30 reaches the fully closed position (Step S35 of FIG. 6: NO).

Moreover, when any of the BD opening/closing SWs 3b, 4b, 6b is operated (Step S33 of FIG. 6: YES) and it is an operation (stopping operation or auto-opening operation) other than the auto-closing operation (Step S34 of FIG. 6: NO), the previously accepted auto-closing operation becomes invalid. Accordingly, the controller 1 stops the driving of the motor 20 (Step S36 of FIG. 6), to complete the auto-closing process. Subsequently, the main process of FIG. 3 is executed again, and the mode is switched to a mode (stopping mode or auto-opening mode) in accordance with the operation of the BD opening/closing SW 3b, 4b, 6b.

Further, it is assumed that an operation other than the auto-closing operation is not performed in the BD opening/closing SWs 3b, 4b, 6b (Step S33 of FIG. 6: NO or Step S34: YES) and the back door 30 reaches the fully closed position. Then, the controller 1 judges that the back door 30 is at the fully closed position based on the door position detected in the position detector 1a (Step S35 of FIG. 6: YES). The controller 1 then stops the driving of the motor 20 (Step S36 of FIG. 6), to complete the auto-closing process.

In contrast, when the mode is switched from Step S3 of FIG. 3 to the power assisting mode in accordance with a result of the judgment in the mode determining process of FIG. 4, the controller 1 executes a power assisting process (Step S6 of FIG. 3).

Figure 8:
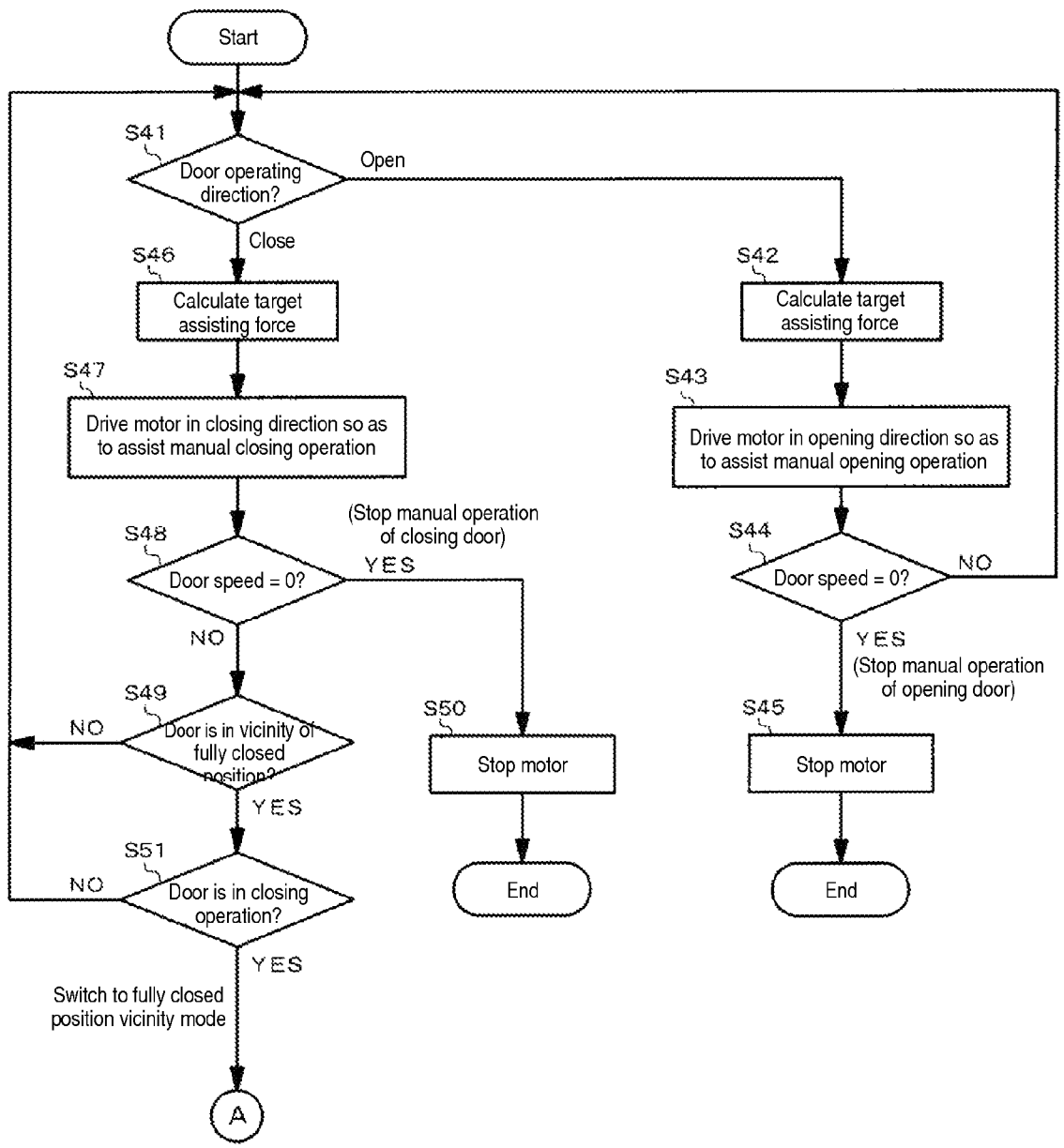
FIG. 8 is a flowchart showing a detail of a power assisting process of FIG. 3.
Figure 9:
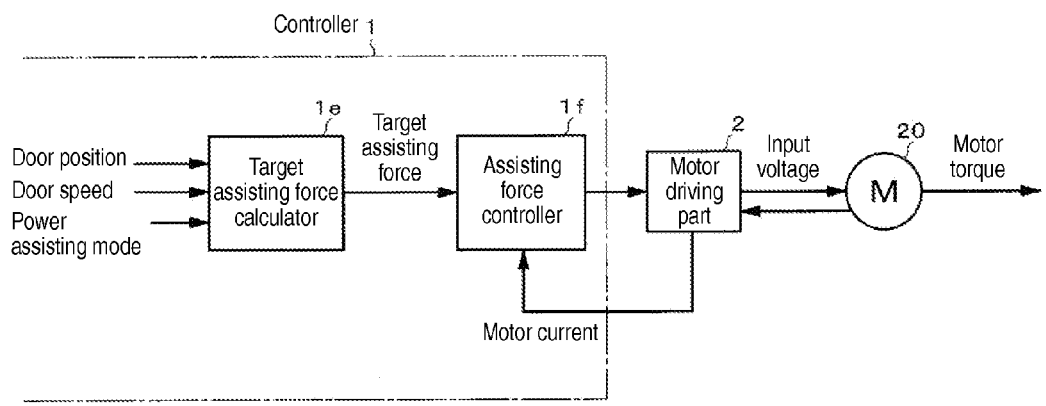
FIG. 9 is a block diagram showing a detail of the power assisting process of FIG. 3.
Figure 10:
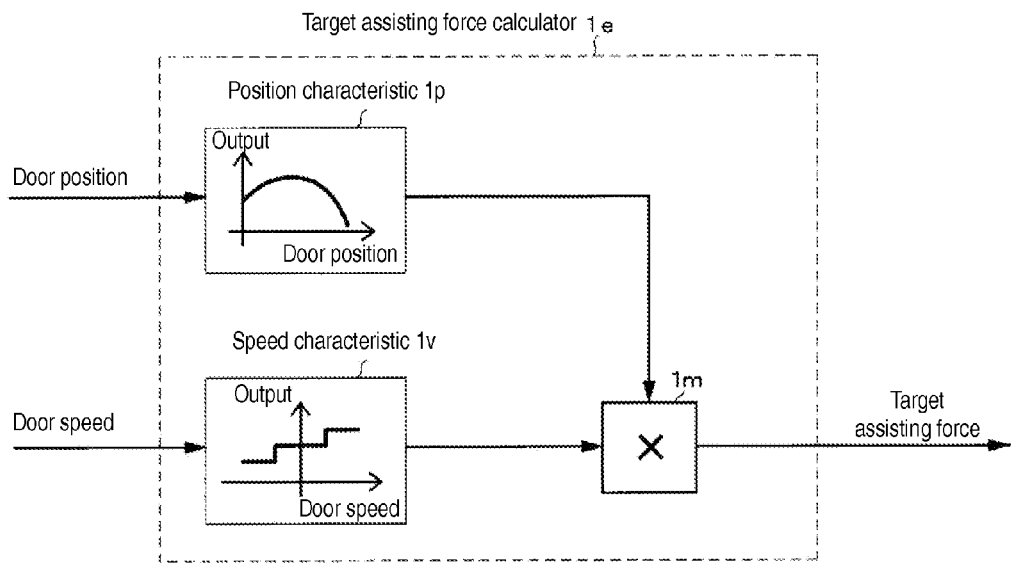
FIG. 10 is a diagram showing a detail of a target assisting force calculator of FIG. 9.

FIG. 8 is a flowchart showing a detail of that power assisting process. FIG. 9 is a block diagram showing a detail of the power assisting process. FIG. 10 is a block diagram showing a detail of the target assisting force calculator 1e. When the power assisting process is started, the controller 1 judges the operating direction (opening/closing direction) of the back door 30 based on a temporal change in the door position detected in the position detector 1a (Step S41 of FIG. 8).

At this time, when the controller 1 judges that the operating direction of the back door 30 is the opening direction (Step S41 of FIG. 8: Open), as shown in FIG. 9, the target assisting force calculator 1e calculates target assisting force for the opening operation based on the door position detected in the position detector 1a and the door speed calculated in the speed calculator 1b (Step S42 of FIG. 8).

Specifically, as shown in FIG. 10, the target assisting force calculator 1e is provided with a position characteristic 1p showing an assisting force component in accordance with a door position, a speed characteristic 1v showing an assisting force component in accordance with a door speed, and a multiplier 1m. When the door position detected in the position detector 1a is inputted, an assisting force component in accordance with the door position is outputted by the position characteristic 1p. Further, when the door speed calculated in the speed calculator 1b is inputted, an assisting force component in accordance with the door speed is outputted by the speed characteristic 1v. Then, these two assisting force components are multiplied in the multiplier 1m, and target assisting force is thereby calculated.

When the target assisting force for the opening operation is calculated in the target assisting force calculator 1e, as shown in FIG. 9, the assisting force controller 1f drives the motor 20 in the opening direction so as to assist the manual operation of opening the back door 30 based on the above target assisting force and the motor current detected in the current detector 2a (Step S43 of FIG. 8).

Specifically, the assisting force controller 1f controls an input voltage into the motor 20 by the motor driving part 2 in accordance with the target assisting force and the motor current, to drive the motor 20 in the opening direction. Accordingly, a motor torque outputted from the motor 20 serves as the operation assisting force, thus leading to reduction in operation force at the time of the operator manually opening the back door 30.

Thereafter, when the operator stops the manual operation of opening the back door 30 and allows the back door 30 to stand still, the door speed calculated in the speed calculator 1b becomes 0 (Step S44 of FIG. 8: YES). Further, when the operator stops the manual operation of opening the back door 30 and takes hand off from the back door 30, the opening operation of the back door 30 continues for a while under the influence of the manual operation. However, the moving speed of the back door 30 gradually decreases by friction force of the BD opening/closing function 21, and the back door 30 eventually stands still, with the door speed becoming 0 (Step S44 of FIG. 8: YES). When confirming that the door speed has become 0, the controller 1 stops the driving of the motor 20 (Step S45 of FIG. 8), to complete the power assisting process. Accordingly, the back door 30 stands still at the intermediate position between the fully closed position and the fully opened position. Thereafter, the main process of FIG. 3 is executed again.

Further, when the operator continues the manual operation of opening the back door 30, the door speed becomes a value other than 0 (e.g., + value) (Step S44 of FIG. 8: NO). In this case, the processes of Steps S41 to S44 of FIG. 8 are repeated. Then, when the back door 30 reaches the fully opened position, the door speed becomes 0 (Step S44 of FIG. 8: YES), the controller 1 stops the driving of the motor 20 (Step S45 of FIG. 8), to complete the power assisting process.

Further, immediately after the start of the power assisting process, when the controller 1 judges that the operating direction of the back door 30 is the closing direction (Step S41 of FIG. 8: Close), as shown in FIG. 9, the target assisting force calculator 1e calculates target assisting force for the closing operation based on the door position detected in the position detector 1a and the door speed calculated in the speed calculator 1b (Step S46 of FIG. 8).

Also at this time, as shown in FIG. 10, in the target assisting force calculator 1e, an assisting force component in accordance with the door position is outputted by the position characteristic 1p and an assisting force component in accordance with the door speed is outputted by the speed characteristic 1v. Then, these two assisting force components are multiplied in the multiplier 1m, and target assisting force is thereby calculated. It is to be noted that the position characteristic 1p and the speed characteristic 1v for the closing operation may be different from the position characteristic 1p and the speed characteristic 1v for the opening operation, or may be the same as those.

When the target assisting force for the closing operation is calculated in the target assisting force calculator 1e, as shown in FIG. 9, the assisting force controller 1f drives the motor 20 in the closing direction so as to assist the manual operation of closing the back door 30 based on the above target assisting force and the motor current (Step S47 of FIG. 8).

Specifically, the assisting force controller 1f controls an input voltage into the motor 20 by the motor driving part 2 in accordance with the target assisting force and the motor current, to drive the motor 20 in the closing direction. Accordingly, a motor torque outputted from the motor 20 serves as operation assisting force, thus leading to reduction in operation force at the time of the operator manually closing the back door 30.

Thereafter, when the operator stops the manual operation of closing the back door 30 and allows the back door 30 to stand still, the door speed calculated in the speed calculator 1b becomes 0 (Step S48 of FIG. 8: YES). Further, when the operator stops the manual operation of closing the back door 30 and takes hand off from the back door 30, the closing operation of the back door 30 continues for a while under the influence of the manual operation. However, the moving speed of the back door 30 gradually decreases by friction force of the BD opening/closing function 21, and the back door 30 eventually stands still, with the door speed becoming 0 (Step S48 of FIG. 8: YES). When confirming that the door speed has become 0, the controller 1 stops the driving of the motor 20 (Step S50 of FIG. 8), to complete the power assisting process. Accordingly, the back door 30 stands still at the intermediate position. Then, the main process of FIG. 3 is executed again.

Further, when the operator continues the manual operation of closing the back door 30, the door speed becomes a value other than 0 (e.g., − value) (Step S48 of FIG. 8: NO). When the back door 30 does not reach the vicinity of the fully closed position at this point, the controller 1 judges that the back door 30 is not in the vicinity of the fully closed position based on the door position detected in the position detector 1a (Step S49 of FIG. 8: NO). Then, the processes of Steps S41 and S46 to S49 of FIG. 8 are repeated.

Thereafter, when the back door 30 reaches the vicinity of the fully closed position at this point, the controller 1 judges that the back door 30 is in the vicinity of the fully closed position based on the door position detected in the position detector 1a (Step S49 of FIG. 8: YES). When confirming that the back door 30 is in the closing operation (Step S51 of FIG. 8: YES) based on a temporal change in the door position, the controller 1 switches the mode from the power assisting mode to the fully closed position vicinity mode of FIG. 3. It is to be noted that, unless the back door 30 is in the closing operation (Step S51 of FIG. 8: NO), the processes of Step S41 and thereafter in FIG. 8 are repeated.

As described above, when the mode is switched from the power assisting mode to the fully closed position vicinity mode or when the mode is switched from Step S3 of FIG. 3 to the fully closed position vicinity mode in accordance with a result of the judgment in the mode determining process of FIG. 4, the controller 1 executes the fully closed position vicinity process (Step S7 of FIG. 3).

Figure 11:
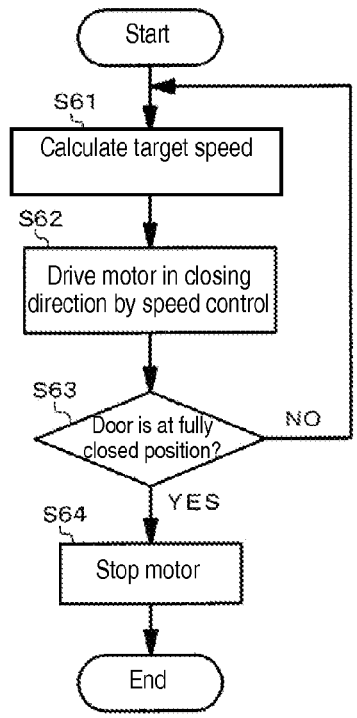
FIG. 11 is a flowchart showing a detail of a fully closed position vicinity process of FIG. 3.
Figure 12:
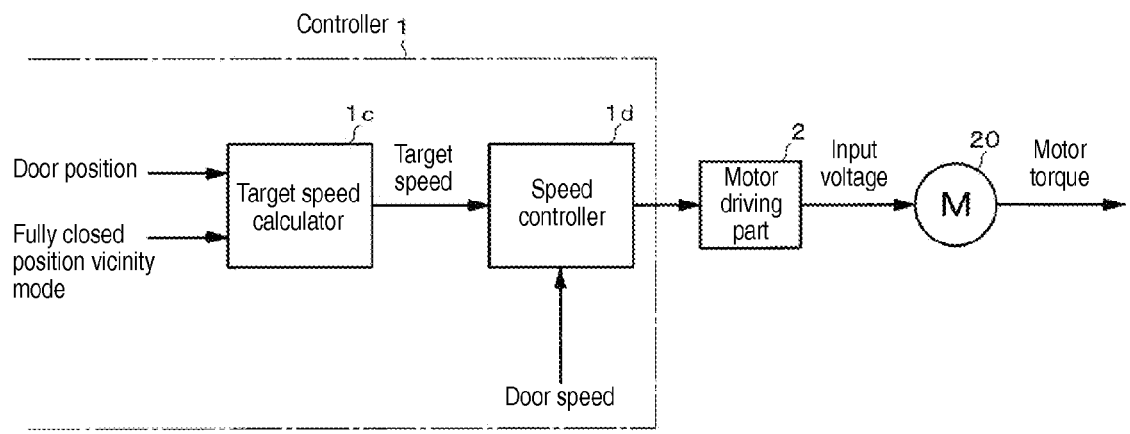
FIG. 12 is a block diagram showing a detail of the fully closed position vicinity process of FIG. 3.

FIG. 11 is a flowchart showing a detail of the fully closed position vicinity process. FIG. 12 is a block diagram showing a detail of the fully closed position vicinity process. When the fully closed position vicinity process is started, as shown in FIG. 12, the target speed calculator 1c calculates a target speed based on the door position detected in the position detector 1a (Step S61 of FIG. 11). Next, the speed controller 1d drives the motor 20 in the closing direction while performing speed control (Step S62 of FIG. 11).

Specifically, the speed controller 1d controls an input voltage into the motor 20 by the motor driving part 2 such that the target speed calculated in the target speed calculator 1c agrees with the door speed calculated in the speed calculator 1b, to drive the motor 20 in the closing direction. Accordingly, regardless of whether or not the operation of closing the back door 30 continues to be manually performed, the BD opening/closing function 21 is operated and the back door 30 is automatically getting closed.

Thereafter, the processes of Steps S61 to S63 of FIG. 11 are repeated until the back door 30 reaches the fully closed position (Step S63 of FIG. 11: NO). Then, when the back door 30 reaches the fully closed position, the controller 1 judges that the back door 30 is at the fully closed position based on the door position detected in the position detector 1a (Step S63 of FIG. 11: YES). The controller 1 then stops the driving of the motor 20 (Step S64 of FIG. 11), to complete the fully closed position vicinity process.

According to the above first embodiment, in the power assisting state for assisting the manual operation of closing the back door 30, the driving of the motor 20 is controlled such that the back door 30 is fully closed no matter whether or not the operator stops the manual operation of closing the back door 30 in the vicinity of the fully closed position. For this reason, the back door 30 is not left in a slightly opened state.

Further, it is assumed that in the power assisting state for assisting the manual closing operation, the operator stops the manual operation of closing the back door 30 by stopping the back door 30 by hand at the intermediate position being between the fully closed position and the fully opened position or taking hand off the back door 30. In these cases, according to the above first embodiment, the back door 30 is not fully closed by the driving of the motor 20 unless the opening/closing position of the back door 30 is in the vicinity of the fully closed position. Hence it is possible to allow the back door 30 to stand still at the desired intermediate position off the vicinity of the fully closed position.

From the above, it is possible to improve the usability of the back door 30 in the power assisting state for assisting the manual operation of closing the back door 30.

Next, an operation of the power back door control device 10 of a second embodiment will be described with reference to FIGS. 13 to 18.

Figure 13:
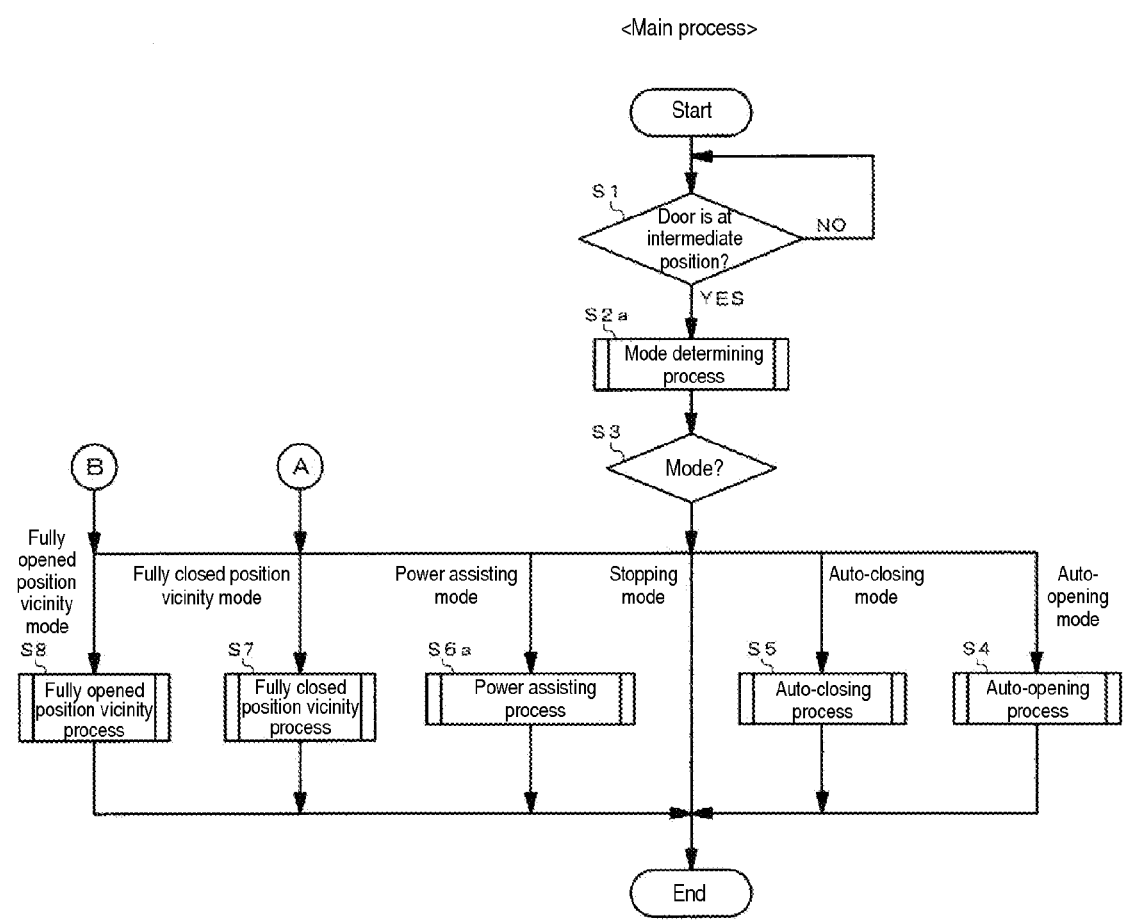
FIG. 13 is a flowchart showing a main process of a power back door control device according to a second embodiment.

FIG. 13 is a flowchart showing a main process of the power back door control device 10 of the second embodiment. In the second embodiment, a fully opened position vicinity mode is added as a mode to be determined in a mode determining process of Step S2a of FIG. 13.

Figure 14:
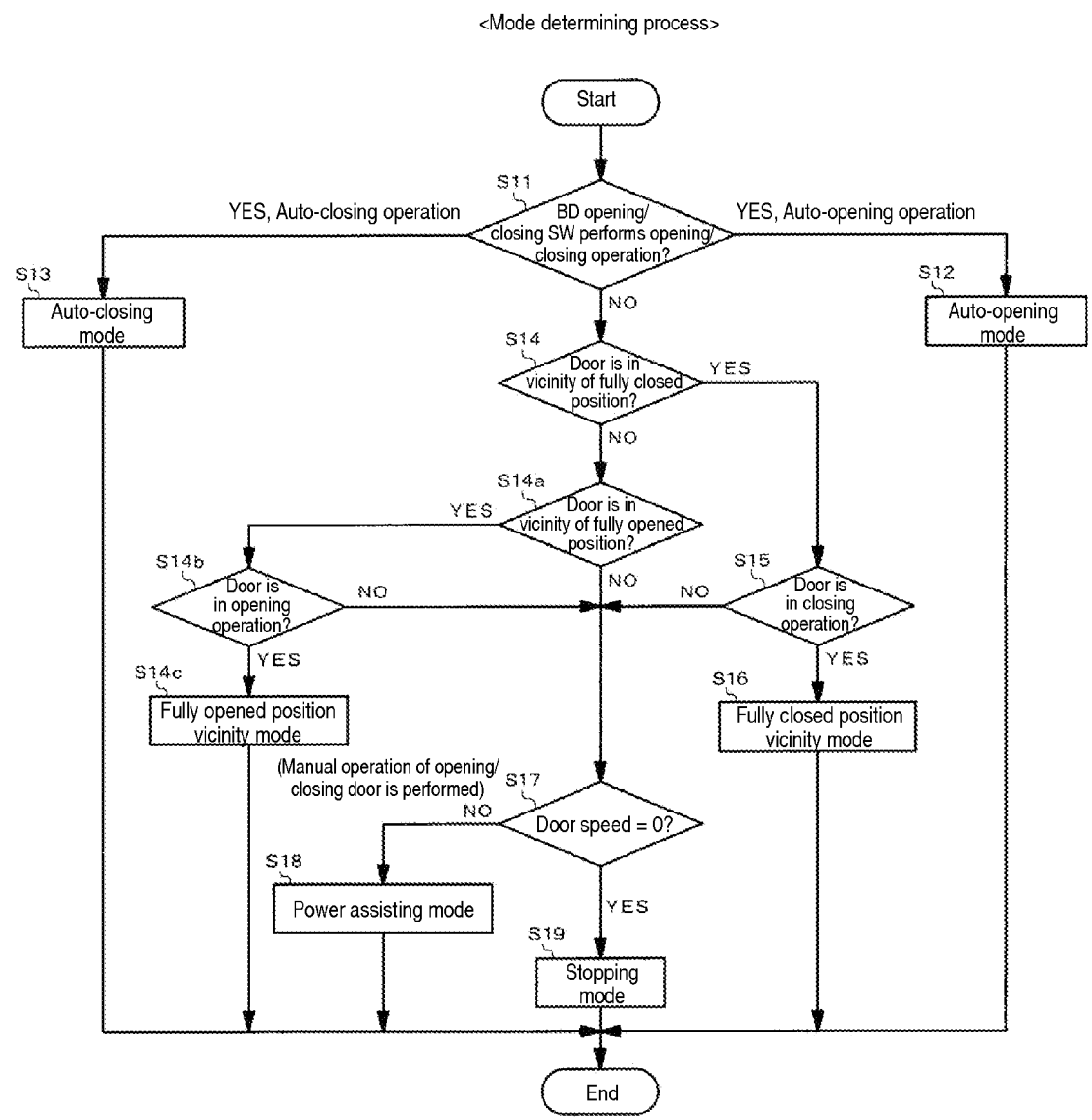
FIG. 14 is a flowchart showing a detail of a mode determining process of FIG. 13.

FIG. 14 is a flowchart showing a detail of that mode determining process. It is assumed that the back door 30 is in the vicinity of the fully opened position in a state where the auto-opening/closing operation is not performed in the BD opening/closing SWs 3b, 4b, 6b (Step S11 of FIG. 14: NO). In this case, the controller 1 judges that the back door 30 is not in the vicinity of the fully closed position but in the vicinity of the fully opened position based on the door position detected in the position detector 1a (Step S14 of FIG. 14: NO, Step S14a: YES). Further, when the operation of opening the back door 30 is being manually performed, the controller 1 judges that the back door 30 is in the opening operation based on a temporal change in the door position (Step S14b of FIG. 14: YES). The mode determining part 1g then determines that the switching destination is a fully opened position vicinity mode (Step S14c of FIG. 14).

It is to be noted that the vicinity of the fully opened position is a predetermined opening/closing range of the back door 30 close to the fully opened position. For example, a range of the back door 30 being inclined in the closing direction from the fully opened position by 10° to 20° may be set as the vicinity of the fully opened position.

Even when the back door 30 is in the vicinity of the fully opened position (Step S14a of FIG. 14: YES), unless the back door 30 is in the opening operation (Step S14b of FIG. 14: NO), the controller 1 confirms the door speed calculated in the speed calculator 1b. Further, also when the auto-opening/closing operation is not performed in the BD opening/closing SWs 3b, 4b, 6b (Step S11 of FIG. 14: NO) and the back door 30 is not in the vicinity of the fully closed position or in the vicinity of the fully opened position (Step S14 of FIG. 14: NO, Step S14a: NO), the controller 1 confirms the door speed calculated in the speed calculator 1b. Here, when the operation of opening or closing the back door 30 is being manually performed, the door speed calculated in the speed calculator 1b becomes a value other than 0 (Step S17 of FIG. 14: NO), and hence the mode determining part 1g determines that the switching destination is a power assisting mode (Step S18 of FIG. 14).

Further, when the operation of opening or closing the back door 30 is not manually performed and the back door 30 stands still, the door speed becomes 0 (Step S17 of FIG. 14: YES), and hence the mode determining part 1g determines that the switching destination is a stopping mode (Step S19 of FIG. 14).

When the mode is switched from Step S3 of FIG. 13 to the power assisting mode in accordance with a result of the judgment in the mode determining process of FIG. 14, the controller 1 executes a power assisting mode process (Step S6a of FIG. 13).

Figure 15:
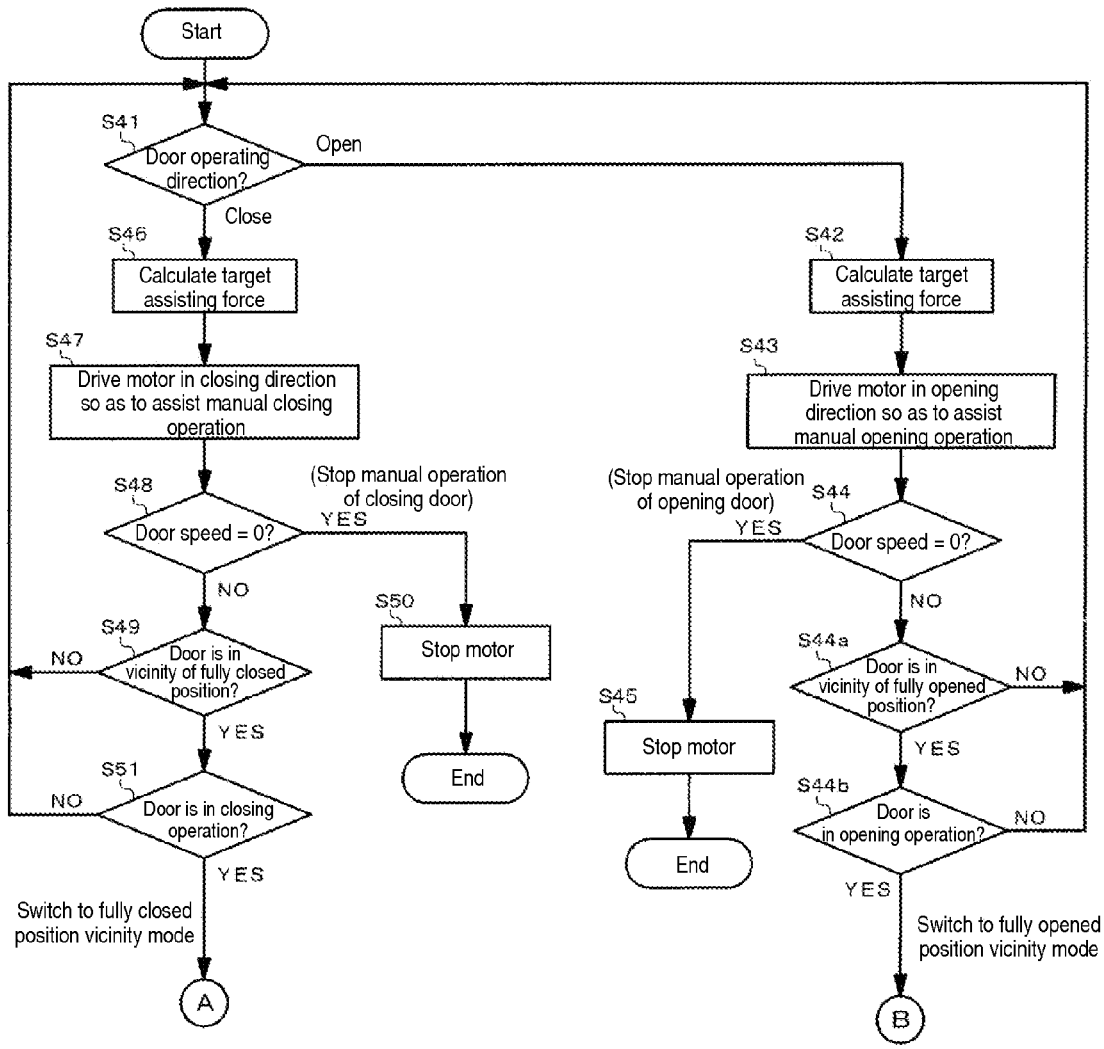
FIG. 15 is a flowchart showing a detail of a power assisting process of FIG. 13.

FIG. 15 is a flowchart showing a detail of that power assisting process. When the operating direction of the back door 30 is the opening direction (Step S41 of FIG. 15: Open), the target assisting force calculator 1e calculates target assisting force for the opening operation (Step S42 of FIG. 15). Then, the assisting force controller 1f drives the motor 20 in the opening direction so as to assist the manual operation of opening the back door 30 (Step S43 of FIG. 15). Thereafter, when the controller 1 judges that the door speed becomes a value other than 0 (Step S44 of FIG. 15: NO), that the back door 30 is in the vicinity of the fully opened position (Step S44a of FIG. 15: YES) and that the back door 30 is in the opening operation (Step S44b of FIG. 15: YES), the controller 1 switches the mode from the power assisting mode to the fully opened position vicinity mode.

As described above, when the mode is switched from the power assisting mode to the fully opened position vicinity mode or when the mode is switched from Step S3 of FIG. 3 to the fully opened position vicinity mode in accordance with a result of the judgment in the mode determining process of FIG. 14, the controller 1 executes the fully opened position vicinity process (Step S8 of FIG. 13).

Figure 16:
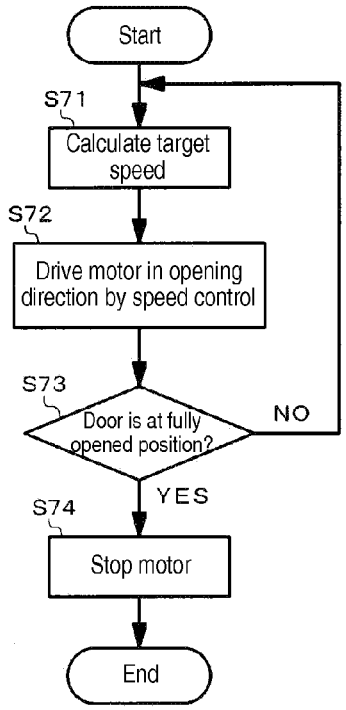
FIG. 16 is a flowchart showing a detail of a fully opened position vicinity process of FIG. 13.
Figure 17:
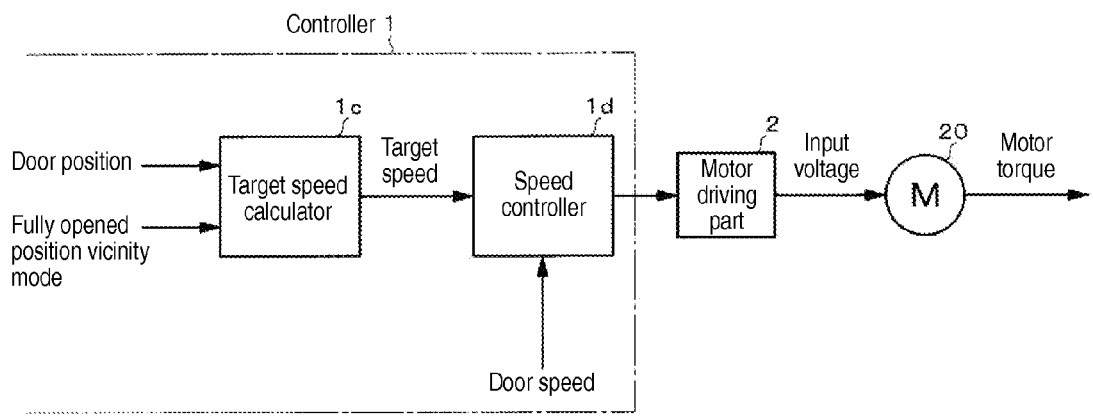
FIG. 17 is a block diagram showing a detail of the fully opened position vicinity process of FIG. 13.

FIG. 16 is a flowchart showing a detail of the fully opened position vicinity process. FIG. 17 is a block diagram showing a detail of the fully opened position vicinity process. When the fully opened position vicinity process is started, as shown in FIG. 17, the target speed calculator 1c calculates a target speed based on the door position detected in the position detector 1a (Step S71 of FIG. 16). Next, the speed controller 1d drives the motor 20 in the opening direction while performing speed control (Step S72 of FIG. 16).

Specifically, the speed controller 1d controls an input voltage into the motor 20 by the motor driving part 2 such that the target speed calculated in the target speed calculator 1c agrees with the door speed calculated in the speed calculator 1b, to drive the motor 20 in the opening direction. Accordingly, regardless of whether or not the operation of opening the back door 30 continues to be manually performed, the BD opening/closing function 21 is operated and the back door 30 is automatically getting open.

Thereafter, the processes of Steps S71 to S73 of FIG. 16 are repeated until the back door 30 reaches the fully opened position (Step S73 of FIG. 16: NO). When the back door 30 reaches the fully opened position, the controller 1 judges that the back door 30 is at the fully opened position based on the door position detected in the position detector 1a (Step S73 of FIG. 16: YES). The controller 1 then stops the driving of the motor 20 (Step S74 of FIG. 16), to complete the auto-opening process.

According to the above second embodiment, in the power assisting state for assisting the manual operation of opening the back door 30, the driving of the motor 20 is controlled such that the back door 30 is fully opened no matter whether or not the operator stops the manual operation of opening the back door 30 in the vicinity of the fully opened position. For this reason, the back door 30 is not left in the state of being slightly inclined in the closing direction.

Figure 18:
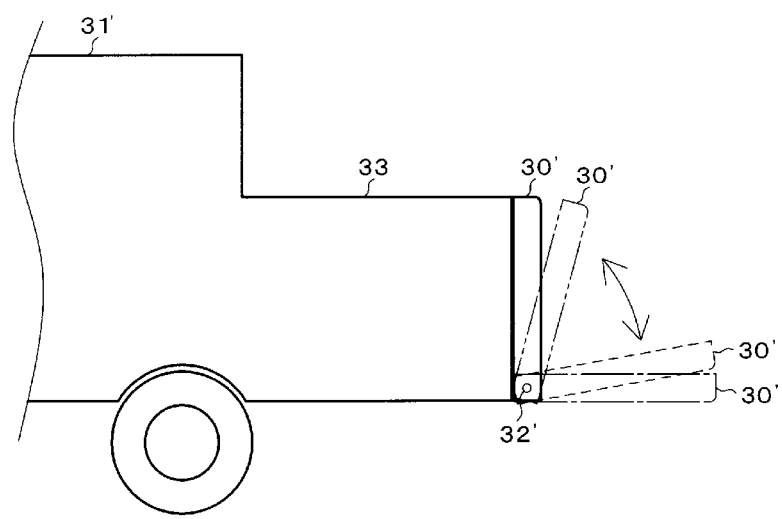
FIG. 18 is a view showing another example of the back door.

In particular, when the above second embodiment is applied to a drop back door 30' which can be swung around a rotation axis 32' at a bottom end and which is closed by being raised and is opened by being put down backward, as shown in FIG. 18, the following inconvenience can be avoided. When the back door 30' is left in the state of being inclined upward in the vicinity of the fully opened position as indicated by a dotted line, it becomes difficult to get luggage into and out of the back of a car body 31' with respect to a bed 33 due to interruption of the back door 30'. However, according to the second embodiment, the back door 30' is not left in the state indicated by the broken line, but becomes fully opened in an almost horizontal state as indicated by a dashed line. Accordingly, it is possible to facilitate getting luggage into and out of the back of the car body 31' with respect to the bed 33 through the top of the fully opened back door 30''.

It is to be noted that in FIG. 18, the back door 30' being at the fully closed position is indicated by a solid line. The back door 30' being in the vicinity of the fully closed position is indicated by a chain double-dashed line. The back door 30' being at the fully opened position is indicated by the dashed line. The back door 30' being in the vicinity of the fully opened position is indicated by the broken line.

Further, it is assumed that in the power assisting state for assisting the manual opening operation, the operator stops the manual operation of opening the back door 30 by stopping the back door 30 by hand at the intermediate position or taking hand off the back door 30. In these cases, according to the above second embodiment, the back door 30 is not fully opened by driving the motor 20 unless the opening/closing position of the back door 30 is in the vicinity of the fully opened position. Hence it is possible to allow the back door 30 to stand still in the vicinity of the fully opened position or at the desired intermediate position off the vicinity of the fully closed position.

From the above, it is possible to improve the usability of the back door 30 also in the power assisting state for assisting the manual operation of opening the back door 30. A similar action effect can be obtained in the case of the back door 30' of FIG. 18.

The disclosure is applicable to a variety of embodiments other than those described above. For example, in an illustrative embodiment, the example has been shown where the position detector 1a detects the opening/closing position of the back door 30 based on outputs of the pulse generator 7, the full-closing detection SW 8 and the full-opening detection SW 9, but the disclosure is not restricted only to this. Other than this, for example, the position detector may detect the opening/closing position of the back door based on outputs from a sensor and a switch, a current flowing in the motor or a frequency of a ripple included in the current flowing in the motor.

Further, the flip-up back door 30 is shown as the example in the first embodiment, but the disclosure is not restricted only to this. The drop back door 30' (FIG. 18) or a back door of another type may be used in place of the back door 30. Moreover, also in the second embodiment, a back door of another type may be used in place of the back doors 30, 30'.

Further, in illustrative embodiments, the example is cited where the disclosure is applied to the power back door control device 10 of the automatic four-wheel car, but this is not restrictive. For example, the disclosure is also applicable to a door opening/closing control device such as a power slide door control device that opens or closes a slide door. Moreover, the disclosure is also applicable to a door opening/closing control device that opens or closes a door by an actuator other than the motor.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:
1. A door opening/closing control device, comprising:
   a controller configured to control driving of an actuator that opens or closes a door;
   a position detector configured to detect an opening/closing position of the door;
   a speed calculator configured to calculate an opening/closing speed of the door based on a temporal change in the opening/closing position detected by the position detector; and
   a target assisting force calculator configured to calculate target assisting force based on the opening/closing position detected by the position detector and the opening/closing speed calculated by the speed calculator,
   the controller controlling the driving of the actuator so as to assist an operation of opening or closing the door based on the target assisting force calculated by the target assisting force calculator,
   wherein the controller controls the driving of the actuator such that the door is fully closed upon judgment that the opening/closing position of the door is in the vicinity of the fully closed position based on the opening/closing position detected by the position detector, the controller controlling the driving of the actuator so as to assist an operation of opening or closing the door is performed when the door is manually operated, the controller controls the driving of the actuator such that the door is fully closed upon judgment that the opening/closing position of the door is in the vicinity of the fully closed position in the case of controlling the driving of the actuator so as to assist the operation of closing the door, the controller controls the driving of the actuator such that the door is fully opened upon judgment that the opening/closing position of the door is in the vicinity of the fully opened position based on the opening/closing position detected by the position detector, and when the manual operation of the door is stopped where the opening/closing position of the door is not in the vicinity of the fully closed position or the fully opened position, the door is stopped.

2. The door opening/closing control device according to claim 1, wherein the controller controls the driving of the actuator such that the door is fully opened upon judgment that the opening/closing position of the door is in the vicinity of the fully opened position in the case of controlling the driving of the actuator so as to assist the operation of opening the door.

* * * * *